United States Patent [19]

Sakuma

[11] Patent Number: 5,327,565
[45] Date of Patent: Jul. 5, 1994

[54] DATA PROCESSING APPARATUS

[75] Inventor: Hajime Sakuma, Tokyo, Japan

[73] Assignee: NEC Corporation, Tokyo, Japan

[21] Appl. No.: 871,231

[22] Filed: Apr. 20, 1992

[30] Foreign Application Priority Data

Apr. 26, 1991 [JP] Japan .................................. 3-096497

[51] Int. Cl.$^5$ .............................................. G06F 9/46
[52] U.S. Cl. ............................. 395/725; 364/DIG. 1;
364/230.2; 364/262.4; 364/262.7; 364/247;
395/375
[58] Field of Search .................... 395/375, 725

[56] References Cited

U.S. PATENT DOCUMENTS

| | | |
|---|---|---|
| 4,274,138 | 6/1981 | Shimokawa . |
| 4,791,560 | 12/1988 | Lahti et al. ............... 395/375 |
| 4,930,068 | 5/1990 | Katayose et al. .......... 395/725 |

FOREIGN PATENT DOCUMENTS

0349004  3/1990  European Pat. Off. .
2176832 12/1988  Japan .

*Primary Examiner*—Debra A. Chun
*Attorney, Agent, or Firm*—Whitham & Marhoefer

[57] ABSTRACT

A macroservice engine is provided to exclusively carry out a sequence control in a processing of a macroservice. On the other hand, a command execution unit carries out no macroservice, but generates a bus cycle exciting request for a bus control unit, when an access request signal is generated to access a memory or peripheral registers included in a microcomputer. Thus, a processing of interruption is carried out with high speed, and a burden of a central processing unit is relieved in an interruption process.

4 Claims, 8 Drawing Sheets

FIG.2 PRIOR ART

| | T1 | T2 | T3 | T4 | T5 | T6 | T7 | T8 | T9 | T10 |
|---|---|---|---|---|---|---|---|---|---|---|
| EXU | AB←CB | B1 | B2 | LSL←MODE | # JUMP DETERMINATION | ALUIO2 OPERATION | CB+1 = SFRP | AB← SFRP | B1 | B2 |

| | T11 | T12 | T13 | T14 | T15 | T16 | T17 | T18 | T19 | T20 |
|---|---|---|---|---|---|---|---|---|---|---|
| EXU | LSL←SFRP | AB← SFRP | B1 | B2 | LSL←(SFR) | (SFR) HOLD | ALUIO2 OPERATION | CB+3 = MEMP | AB← MEMP | B1 |

| | T21 | T22 | T23 | T24 | T25 | T26 | T27 | T28 | T29 | T30 |
|---|---|---|---|---|---|---|---|---|---|---|
| EXU | B2 | LSL←MEMP | AB← MEMP | B1 | B2 | LSL←(MEM) | ALUIO2 OPERATION | (MEM)+(SFR) | AB← MEMP | LSL← (MEM)+(SFR) |

| | T31 | T32 | T33 | T34 | T35 | T36 | T37 | T38 | T39 | T40 |
|---|---|---|---|---|---|---|---|---|---|---|
| EXU | B2 | | ALUIO2 OPERATION | MEMP+1 | AB← MEMP | LSL← MEMP+1 | B2 | LOAD | ALUIO2 OPERATION | CB+5 = MSC |

| | T41 | T42 | T43 | T44 | T45 | T46 | T47 | T48 | T49 | T50 |
|---|---|---|---|---|---|---|---|---|---|---|
| EXU | AB← RSC | B1 | B2 | LSL←MSC | ALUIO2 OPERATION | MSC-1 | AB← MSC | LSL←MSC-1 | B2 | LOAD |

FIG. 4

| | T1 | T2 | T3 | T4 | T5 | T6 | T7 | T8 | T9 | T10 |
|---|---|---|---|---|---|---|---|---|---|---|
| MSE | BUS210←CB | MB1 | MB2 | BUS211←MODE | MODE DETERMINATION | ALU402 OPERATION | CB+1 =SFRP | BUS210←SFRP | MB1 | MB2 |
| MSE | — | MAB←SFRP BRQ | ALU402 OPERATION | CB+3 =MEMP | BUS210←MEMP | MB1 | MB2 | BUS210←MEMP | MAB←MEMP BRQ | ALU402 OPERATION |
| EXU | BUS211←SFRP | — | — | — | — | — | — | AB←MAB ⟨SFRP⟩ | B1 | B2 |

| | T11 | T12 | T13 | T14 | T15 | T16 | T17 | T18 | T19 | T20 |
|---|---|---|---|---|---|---|---|---|---|---|
| MSE | MEMP+1 | TEMP403← MLSL⟨(SFR)⟩ | — | CB+3 =MEMP | — | MB1 | MB2 | BUS210←MEMP | MAB←MEMP BRQ | B2 |
| EXU | LSL←(SFR) | MLSL←LSL ⟨(SFR)⟩ | — | — | — | — | — | AB←MAB ⟨SFRP⟩ | B1 | B2 |

| | T21 | T22 | T23 | T24 | T25 | T26 | T27 | T28 | T29 | T30 |
|---|---|---|---|---|---|---|---|---|---|---|
| MSE | MLSL← (MEM)+(SFR) | ALU402 OPERATION | BUS210←MEMP | BUS211← MEMP+1 | MB2 | LOAD | TEMP403← MLSL⟨(MEM)⟩ | ALU402 OPERATION | (MEM)+(SFR) | MAB←MEMP BRQ |
| EXU | — | — | AB←MAB ⟨MEMP⟩ | B1 | B2 | LSL←(MEM) | MLSL←LSL ⟨(MEM)⟩ | — | — | — |

| | T31 | T32 | T33 | T34 | T35 | T36 | T37 | T38 | T39 | T40 |
|---|---|---|---|---|---|---|---|---|---|---|
| MSE | — | ALU402 OPERATION | CB+5 =MSC | BUS210←MSC | MB1 | MB2 | BUS211←MSC | ALU402 OPERATION | MSC−1 | BUS210← MSC |
| EXU | MLSL← (MEM)+(SFR) | — | — | END | AB←MAB ⟨MEMP⟩ | LSL←MLSL (MEM)+(SFR) | B2 | LOAD | — | — |

| | T41 | T42 | T43 |
|---|---|---|---|
| MSE | BUS211← MSC−1 | MB2 | LOAD |
| EXU | — | — | — |

FIG. 6

|     | T1 | T2 | T3 | T4 | T5 | T6 | T7 | T8 | T9 | T10 |
|-----|----|----|----|----|----|----|----|----|----|----|
| MSE | BUS210←CB | MB1 | MB2 | BUS211←MODE | MODE DETERMINATION | ALU402 OPERATION | CB+1 = SFRP | BUS210←SFRP | MB1 | MB2 |

|     | T11 | T12 | T13 | T14 | T15 | T16 | T17 | T18 | T19 | T20 |
|-----|-----|-----|-----|-----|-----|-----|-----|-----|-----|-----|
| MSE | BUS211←SFRP | MAB←SFRP BRQ | ALU402 OPERATION | CB+3 = MEMP | BUS210←MEMP | MB1 | MB2 | BUS210←MEMP | MAB←MEMP BRQ | TEMP403←MLSL⟨(SFR)⟩ |
| EXU | — | — | AB←MAB ⟨(SFR)⟩ | B1 | B2 | — | — | — | — | AB←MAB ⟨MEMP⟩ |

|     | T21 | T22 | T23 | T24 | T25 | T26 | T27 | T28 | T29 | T30 |
|-----|-----|-----|-----|-----|-----|-----|-----|-----|-----|-----|
| MSE | ALU402 OPERATION | MEMP+1 | — | TEMP403←MLSL⟨(MEM)⟩ | ALU402 OPERATION | (MEM)+(SFR) | MAB←MEMP BRQ | MLSL← (MEM)+(SFR) | BUS210←MEMP | BUS211← MEMP+1 |
| EXU | B1 | B2 | LSL←(MEM) | MLSL←LSL ⟨(MEM)⟩ | — | LSL←(SFR) | MLSL←LSL ⟨(SFR)⟩ | AB←MAB ⟨MEMP⟩ | LSL←MLSL (MEM)+(SFR) | B2 |

|     | T31 | T32 | T33 | T34 | T35 | T36 | T37 | T38 | T39 | T40 |
|-----|-----|-----|-----|-----|-----|-----|-----|-----|-----|-----|
| MSE | MB2 | LOAD | ALU402 OPERATION | CB+5 = MSC | BUS210←MSC | MB1 | MB2 | BUS211←MSC | ALU402 OPERATION | MSC−1 |
| EXU | — | — | — | — | — | — | — | — | — | — |

|     | T41 | T42 | T43 | T44 |
|-----|-----|-----|-----|-----|
| MSE | BUS210←MSC | BUS211←MSC−1 | MB2 | LOAD |
| EXU | — | — | — | — |

FIG. 8

| | T1 | T2 | T3 | T4 | T5 | T6 | T7 | T8 | T9 | T10 |
|---|---|---|---|---|---|---|---|---|---|---|
| MSE | BUS210←CB | MB1 | MB2 | BUS211←MODE | MODE DETERMINATION | ALU402 OPERATION | CB+1=SFRP | BUS210←SFRP | MB1 | MB2 |

| | T11 | T12 | T13 | T14 | T15 | T16 | T17 | T18 | T19 | T20 |
|---|---|---|---|---|---|---|---|---|---|---|
| MSE | BUS211←SFRP | AB←SFRP | ALU402 OPERATION | CB+3=MEMP | BUS210←MEMP | MB1 | MB2 | BUS210←MEMP | AB←MEMP | TEMP403←LSL((SFR)) |
| BCU | — | AB←SFRP | B1 | B2 | LSL←(SFR) | — | — | — | AB←MEMP | B1 |

| | T21 | T22 | T23 | T24 | T25 | T26 | T27 | T28 | T29 | T30 |
|---|---|---|---|---|---|---|---|---|---|---|
| MSE | ALU402 OPERATION | MEMP+1 | TEMP403←LSL((MEM)) | ALU402 OPERATION | (MEM)+(SFR) | AB←MEMP | LSL←(MEM)+(SFR) | BUS210←MEMP | BUS211←MEMP+1 | MB2 |
| BCU | B2 | LSL←(MEM) | — | — | — | AB←MEMP | LSL←(MEM)+(SFR) | — | LOAD | — |

| | T31 | T32 | T33 | T34 | T35 | T36 | T37 | T38 | T39 | T40 |
|---|---|---|---|---|---|---|---|---|---|---|
| MSE | LOAD | ALU402 OPERATION | CB+5=MSC | BUS210←MSC | MB1 | MB2 | BUS211←MSC | ALU402 OPERATION | MSC-1 | BUS210←MSC |
| BCU | — | — | — | — | — | — | — | — | — | — |

| | T41 | T42 | T43 |
|---|---|---|---|
| MSE | BUS211←MSC-1 | MB2 | LOAD |
| BCU | — | — | — |

1

DATA PROCESSING APPARATUS

FIELD OF THE INVENTION

This invention relates to a data processing apparatus, and, more particularly, to a data processing apparatus in which an interrupting program is executed in response to a request for interruption.

BACKGROUND OF THE INVENTION

A data processing apparatus including a microcomputer carries out a series of processes by reading out and executing a program stored in a memory. Usually, the programed processes are executed in accordance with the sequence of the program instructions. However, if a request for interrupting the program is generated in the data processing apparatus or an external circuit, the data processing apparatus suspends processing of the current program now in operation, reads out an interrupting program corresponding to the request, and executes it. After finishing the interrupting program, the data processing apparatus continues the program which is suspended.

One algorithm for shifting the control state of the data processing apparatus from a state of executing the current program to that of executing the interrupting program is a so-called vector interruption process. In the vector interruption process, if a request for interrupting is generated, the data processing apparatus transfers an address indicated by a program counter and program state words to a stack region of the memory. Then, the data processing apparatus reads an initial address of the interrupting program corresponding to the interrupting source from a vector table. Then, the operation is jumped to the initial address of the interrupting program. The data processing apparatus starts executing the interrupting program by fetching a new command code thereof. When execution of the interrupting program finishes, the data processing apparatus reads out the contents of the stack region of the memory, and then restarts executing the program interrupted by the vector interruption.

The vector interruption is used for general purpose; however, it has a disadvantage in that it takes a considerable time to transfer a context such as the address of the current program to the stack region of the memory, to read an initial address of the interrupting program, to restore the context after finishing the interrupting program, etc., so that the vector interruption is difficult to apply to a control program which requires a high speed response.

Recently, there has been developed a microcomputer in which an extremely high speed interrupting process is carried out beside the vector interrupting process, that is a single chip microcomputer "78K/III family" or "78K/VI family" of NEC Corporation. Such a high speed interrupting process is called as a macroservice process.

One type of a conventional data processing apparatus in which the macroservice process is carried out includes an execution unit which executes commands of a program, a bus controller, and an interruption controller which controls the interrupting process.

In the macroservice process, the request for interruption is generated by the interruption controller, and the execution unit samples the request in an interval of execution of commands of the current program. If the request is accepted, the interrupting process is executed by the execution unit in the interval between the two commands of the current program, so that it is not required to transfer the context of the present state to a memory stack region, jump to the interrupting program, fetch a command of the interrupting program, and recall the context.

According to the conventional data processing apparatus, however, there is a disadvantage in that it takes still a substantial time to execute the interrupting process, so that the execution unit is occupied with a time ratio by execution of the interrupting process if there are a number of requests for interruption. Therefore, the execution unit has a time restriction to execute the commands of the current program. If the interrupting process is a relatively simple process such as a simple arithmetic operation or accessing a memory or an internal register, the burden of the execution unit is not so heavy. However, if the interrupting process is more complicated, the burden of the execution unit becomes heavy.

SUMMARY OF THE INVENTION

Accordingly, it is an object of the invention to provide a data processing apparatus in which a high speed macroservice interruption is realized.

It is another object of the invention to provide a data processing apparatus in which a current program can be executed in parallel to an execution of the interrupting process.

According to a feature of the invention, a data processing apparatus comprises:

a central processing unit for carrying out a predetermined logic calculation to control peripheral circuits;

an interruption controller for generating a processing request signal by receiving an interruption request signal;

a data control unit for carrying out a sequence control of a predetermined processing in response to the processing request signal, and for generating an access request signal to be supplied to said central processing unit;

a memory for storing a predetermined processing information including an address of a specified register of a peripheral register set relating to the peripheral circuits, an address of a specified memory region of the memory, and a specified processing information; and means for accessing a predetermined space of the memory directly from the data control unit;

wherein the central control unit accesses the peripheral register set and the memory in accordance with the addresses of the specified register and memory region when the access request signal is generated, and carries out the predetermined processing in accordance with the specified processing information.

BRIEF DESCRIPTION OF THE DRAWINGS

The invention will be explained in more detail in conjunction with appended drawings wherein:

FIG. 2 is a sequence chart showing a sequence of a macroservice process in the conventional data processing apparatus;

FIG. 4 is a sequence chart showing a sequence of a macroservice process in the data processing apparatus in the first preferred embodiment according to the invention;

FIG. 6 is a sequence chart showing a sequence of a macroservice process in the data processing apparatus in the second preferred embodiment according to the invention;

FIG. 8 is a sequence chart showing a sequence of a macroservice process in the data processing apparatus in the third preferred embodiment according to the invention.

DESCRIPTION OF THE PREFERRED EMBODIMENTS

Before describing a data processing apparatus in preferred embodiments according to the invention, the conventional data processing apparatus described before will be explained.

Figure 1:
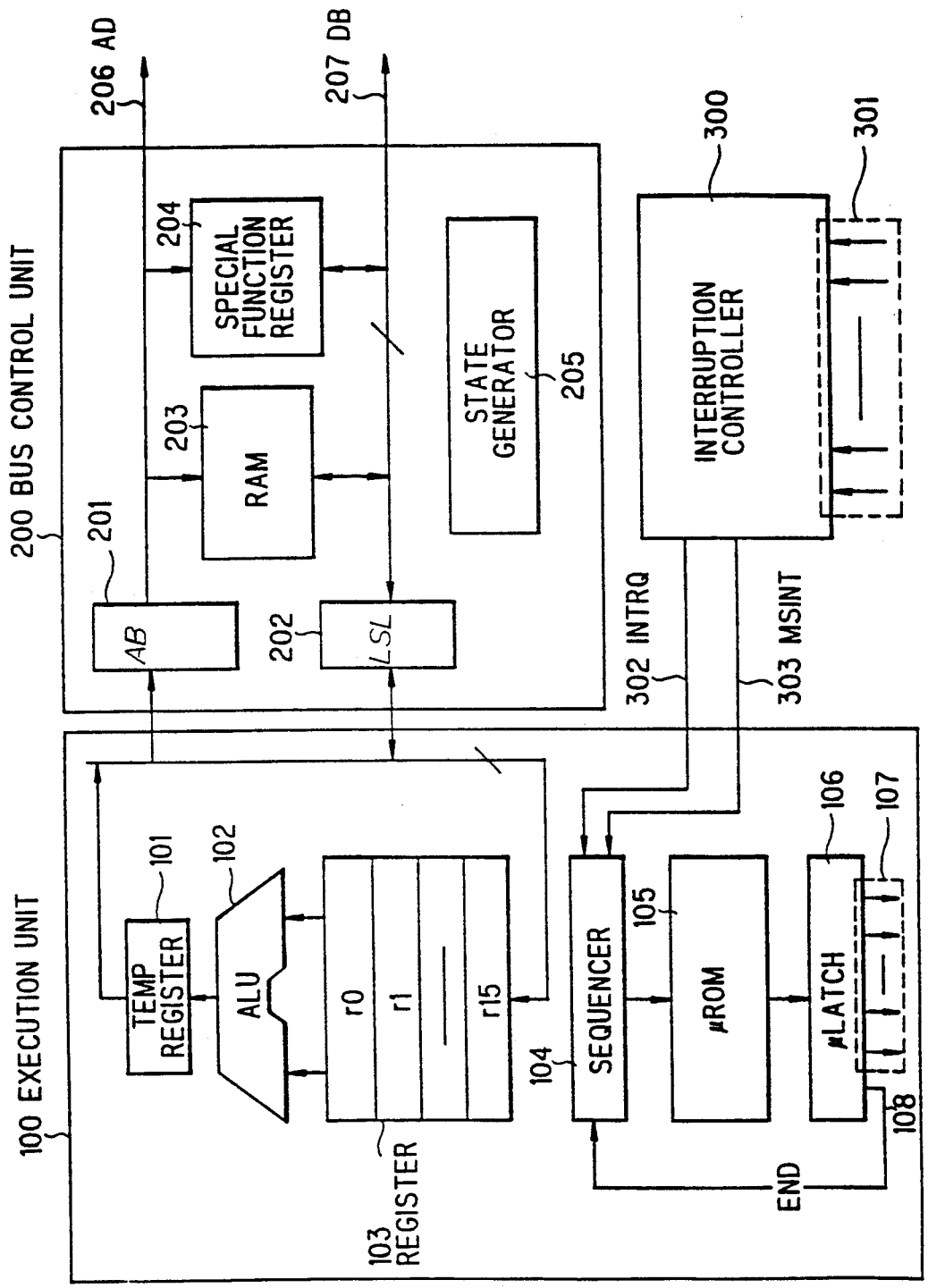
FIG. 1 is a block diagram of a conventional data processing apparatus.

FIG. 1 shows a conventional data processing apparatus. The data processing apparatus includes an execution unit (EXU) 100, a bus control unit (BCU) 200 and an interruption controller (INTC) 300. The EXU 100 includes a temporally register (TEMP) 101, an arithmetic and logic unit (ALU) 102, a general register set 103, a sequencer 104 which controls the sequence of execution of commands, a microprogram ROM (μ ROM) 105, a microprogram latch (μ LATCH) 106 which latches an output of the μ ROM 105, and microprogram order (μ ORDER) 107 which controls the hardware. The general register set 103 typically consists of sixteen registers r0 to r15; however, the number of registers in the general register set 103 may vary.

The μ LATCH 106 supplies the sequencer 104 with an END signal 108 which indicates an end of the microprogram. The END signal 108, which is supplied when the microprogram finishes, commands the sequencer 104 to decode the next command and start executing the new microprogram. Usually, it is detected if the request signal for interruption is generated at a timing when the END signal 108 is supplied. In other words, it is checked as to whether the request for interruption is generated during each interval of executions of commands.

The BCU 200 includes an address buffer (AB) 201, a latch (LSL) 202 which stores load data, a RAM 203 which stores data, a register group (SFR) 204 such as mode registers for controlling peripheral circuits included in the microcomputer or buffers, an address bus (AD) 206, a data bus (DB) 207, and a state generator (STG) 205 which generates a timing signal in the BCU 200.

The INTC 300 selects one request from a plurality of requests 301 for interruption and supplies the sequencer 104 of the EXU 10 with an interrupting request signal (INTRQ) 302. At the same timing, the INTC 300 also supplies the sequencer 104 with a mode designating signal (MSINT) 303 which informs the sequencer 104 of the kinds of the requests whether the request is the vector interruption or the macroservice interruption. Whether the request is the vector interruption or the macroservice interruption is determined in advance in each interruption source.

Table 1 shows a so-called macroservice channel which is the data structure in the RAM 203 in which information for designating operations of the macroservice process is stored.

TABLE 1

| MODE | CB |
|---|---|
| SFRP | CB+1 |
|  | CB+2 |
| MEMP | CB+3 |
|  | CB+4 |
| MSC | CB+5 |

The macroservice channel, which is stored in the RAM 203, is provided in each interruption source.

In the conventional data processing apparatus, the macroservice channel consists of six words. In this explanation, the six words are allocated with six addresses CB, and CB+1 to CB+5. The 0th word stores MODE which designates a mode of the operation, the 1st and 2nd words store a pointer SFRP for the SFR 204, the 3rd and 4th words store a pointer MEMP for the corresponding memory, and the 5th word stores a macroservice counter MSC which counts the number of times of the macroservice interrupting process. In the conventional data processing apparatus, MODE indicates a mode in which a sum of the contents of the SFR 204 and the memory is stored in the memory and then increasing MEMP and decreasing MSC. Structures of the macroservice channels, manners of designating modes or kinds of modes may vary.

FIG. 2 shows sequences in execution of the macroservice interrupting process in the conventional data processing apparatus after the sequencer 104 starts executing the microprogram for the macroservice process. In order to start executing the microprogram for the macroservice process, the INTC 300 supplies the sequencer 104 with the request signal INTRQ 302 and the mode designating signal MSINTC 303 which designate the mode to be the macroservice. On the other hand, the sequencer 104 samples the request signal INTRQ 302 in each interval of executions of commands of the current program. When the sequencer 104 receives the request signal INTRQ 302 requesting interruption and the mode designating signal MSINTC 303 designating the mode to be the macroservice, the sequencer 104 starts executing the microprogram for the macroservice process as shown in FIG. 2. The microprogram is executed in each clock for 50 clocks from T1 to T50.

In details of the sequence, first, an access to the macroservice channel stored in the RAM 203 corresponding to the interruption source begins. At the timings T1 to T4, MODE in the macroservice channel is read. At the timing T1, the base address CB of the macroservice channel is loaded to the AB 201 and the request signal for reading is supplied to the STG 205. B1 and B2 in the timings T2 and T3 indicate bus cycles, respectively. At the timing T4, MODE in the macroservice channel is loaded to the LSL 202. At the timing T5, MODE stored in the LSL 202 is read and it is determined which mode to be executed, and the sequence is jumped to the microprogram of the interrupting process. At the timing T6 and after that, the practical process of the macroservice begins. At the timings T6 and T7, an address (@SFRP) CB+1 of SFRP in the macroservice channel is generated using the ALU 102. At the timings T8 to T11, the process of reading SFRP is executed. At the timings T12 to T15, the content of the SFR 204 designated by SFRP (defined as "SFR" hereinafter) is read. At the timing T16, "SFR" loaded to the LSL 202 is retained temporally in the EXU 100. At the timings T17 and T18, an address (@MEMP) CB+3 of MEMP in the macroservice channel is generated by the ALU 102. At the timings T19 to T22, the process of reading MEMP in the macroservice channel is carried out. At the timings T23 to T26, a content of the memory is read. An access to the memory is carried out through the AD 206 using MEMP stored in the AB 201. At the timing T26, the content of the memory designated by MEMP (defined as "MEM" hereinafter) is stored in the LSL 202 through the DB 207. At the timings T27 and T28, a sum of "SFR" and "MEM" is calculated by the ALU 102, and the sum is retained. At the timings T29 to T32, the sum is written to the memory. The sum is written to the LSL 202 at the timing T30, and then written to the memory at the timing T32. MEMP is added by one to obtain MEMP+1 at the timings T33 and T34, and then MEMP+1 is rewritten to the macroservice channel at the timings T35 to T38. In the same manner, an address (@MSC) of MSC in the macroservice channel is generated at the timings T39 and T40. MSC is read at the timings T41 to T44, and the MSC is subtracted by one to obtain MSC−1 at the timings T45 and T46. Finally, MSC−1 is rewritten to the macroservice channel.

In the 78K/III or 78K/VI family, the process for changing the modes from the macroservice mode to the vector interruption mode is carried out when MSC becomes zero, though the explanation thereof is not made, because it has nothing to do directly with the present invention.

As explained above, it takes 50 clocks to finish the macroservice process which is carried out in an interval of execution of commands of the normal program. However, the macroservice does not finish always at the timing of 50th clock from a time at which the INTRQ 302 is supplied by the INTC 300. The sequencer 104 samples the INTRQ 302 at the timing when the END signal 108 is generated, so that the timing of starting the macroservice process is delayed as the generation of the END signal 108 is delayed due to the delay of processing of a command just before sampling the INTRQ 302 by the sequencer 104. For example, if the END signal 108 is generated 5 clocks after the INTRQ 302 is generated, the macroservice process finishes 55 clocks after the request signal for interruption is generated.

In the explanation, the bus cycle for accessing to the internal RAM 203, SFR 204 and the memory is shown as 4 clocks; however, the bus cycle may vary in accordance with kinds of data processing apparatus or the state of the bus.

The macroservice interrupting process has a high efficiency in usual interrupting processes such as an arithmetic operation or data transfer between the memory and the SFR as compared with the vector interrupting process, because the macroservice interrupting process does not require the transfer of the context to a memory stack region, jumping to an initial address of the program to be executed in the interruption, fetching a command, recovering the context from a memory stack region, etc. Which are required in the vector interrupting process.

Next, a data processing apparatus in a first preferred embodiment according to the invention will be explained.

Figure 3:
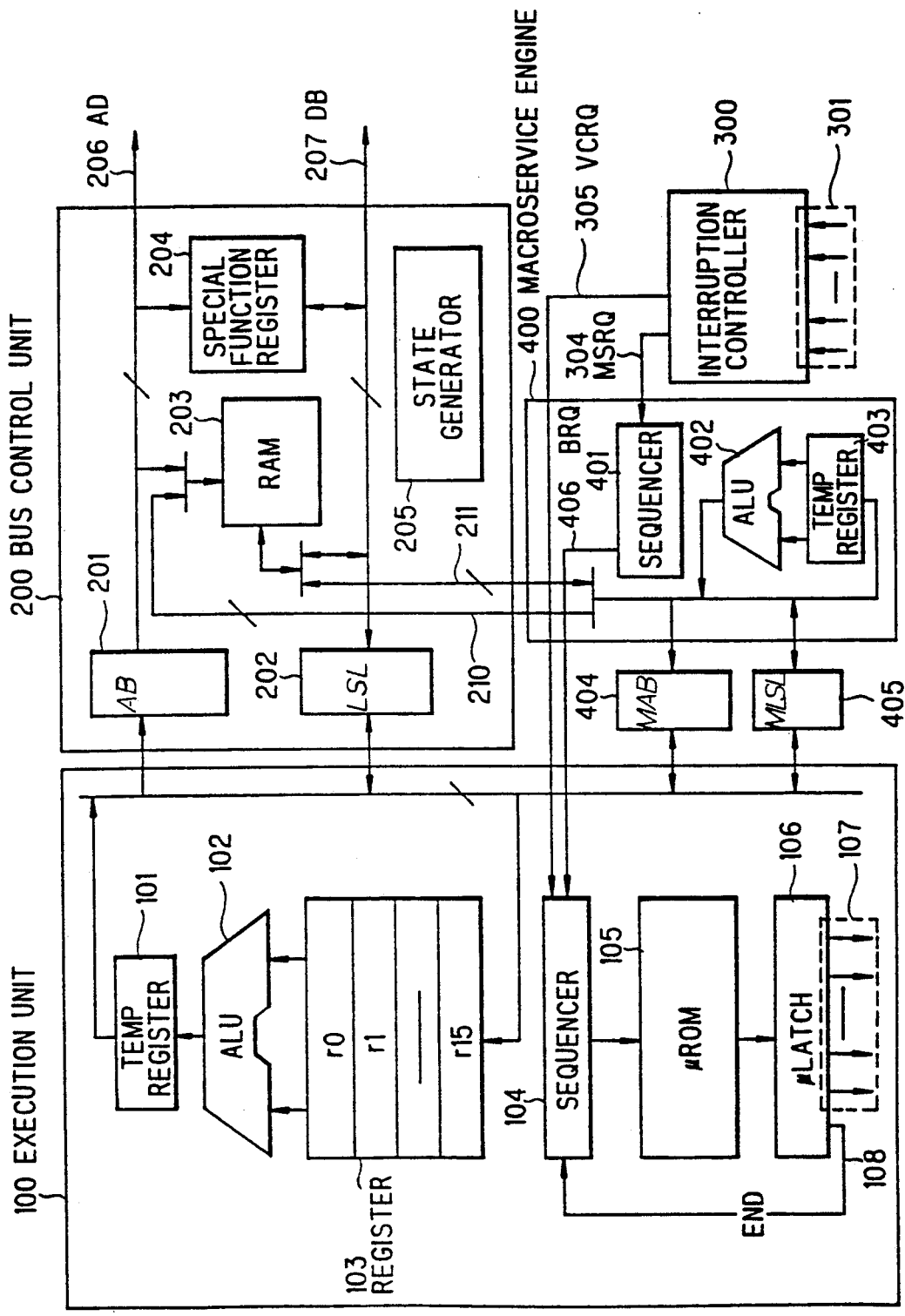
FIG. 3 is a block diagram of a data processing apparatus in a first preferred embodiment according to the invention.

FIG. 3 shows the data processing apparatus. The basic structure of the data processing apparatus is the same as that of the conventional data processing apparatus shown in FIG. 1, however, the data processing apparatus further includes a microservice engine (MSE) 400 for processing the macroservice process exclusively, an address buffer MAB 404, and a latch MSLS 405 for storing or loading data.

The MSE 400 includes a sequencer 401, an ALU 402 and a temporally register (TEMP) 403 consisting of a plurality of single registers. The MSE 400 does not carry out all of the macroservice but only the sequence control of the macroservice process and operation of the macroservice channel stored in the RAM 203. The EXU 100 executes accessing the SFR 204 or the memory as in the conventional data processing apparatus. In other words, the EXU 100 executes the vector interrupting process, while the MSE 400 executes only the macroservice interrupting process. Therefore, there are two different designating signals for the vector and macroservice interrupting processes, respectively. In more detail, the INTC 300 supplies the sequencer 104 of the EXU 100 with a signal VCRQ 305 which designates the vector interruption process to be executed, and supplies the sequencer 401 of the MSE 400 with a signal MSRQ 304 which designates the macroservice interruption process to be executed.

The MSE 400 is interfaced with the EXU 100 by the address buffer MAB 404 and the latch MLSL 405, and with the RAM 203 of the BCU 200 by an address bus 210 and a data bus 211. The sequencer 401 supplies the sequencer 104 with a signal BRQ 406 for requesting operation of a bus cycle. The structure of the macroservice channel stored in the RAM 203 is the same as shown in Table 1.

FIG. 4 shows a sequence of the microservice interrupting process in the data processing apparatus. At the timings T1 to T10, only the sequence of the MSE 400 is shown in FIG. 4, because the EXU 100 executes other command process before the timing T17. At the timings T11 to T43, the sequence of both the MSE 400 and the EXU 100 is shown in parallel. In order to start executing the microprogram for the macroservice process, the INTC 300 supplies the sequencer 401 with the request signal MSRQ 304.

In the conventional data processing apparatus, the sequencer 104 executes commands of the current program as well as the interrupting process, and the sequencer 104 samples the request signal INTRQ 302 in each interval of execution of commands of the current program, so that there is a delay time from a timing of generation of the request signal for interruption to a timing of starting the macroservice interrupting process. On the other hand, in the preferred embodiment, the sequencer 401 is ready for receiving the request signal MSQR 304 at any time, so that the sequencer 401 accepts the request signal MSQR 304 instantly when it is generated. Therefore, there is no delay time from generation of the request signal for interruption to the start of the macroservice interrupting process.

In details of the sequence, first, an access to the macroservice channel stored in the RAM 203 corresponding to the interruption source begins. At the timing T1, the base address CB of the macroservice channel is loaded to the bus 210 and the request for reading is supplied to the STG 205. B1 and B2 at the timings T2 and T3 indicate bus cycles, respectively. At the timing T4, MODE in the macroservice channel is loaded to the bus 211. At the timing T5, MODE is read and it is determined which mode to be executed, and the corresponding macroservice process begins. At the timings T6 and T7, and address (@SFRP) CB+1 of SFRP in the macroservice channel is generated using the ALU 402. At the timings T8 to T11, the process of reading SFRP is carried out. At the timing T12, "SFR" is loaded to the MAB 404, and the signal BRQ 406 is supplied to the sequencer 104 of the EXU 100 to command to read the SFR 204. Though not shown in FIG. 4, the sequencer 104 is also supplied with a signal designating whether to read or to write. At the timings T13 and T14, an address (@MEMP) CB+3 of MEMP in the macroservice channel is generated by the ALU 402. At the timings T15 to T18, the process of reading MEMP is carried out.

On the other hand, the EXU 100 executes commands of the current program before the timing T17, so that the EXU 100 starts the macroservice process after generating the END signal 108 at the timing T17. At the timing T18, the EXU 100 reads SFRP stored in the MAB 404, transfers it to the AB 201 and starts reading cycle of the SFR. At the timings T18 to T21, the contents of the SFR are read. At the timing T22, "SFR" stored in the LSL 202 is loaded to the MLSL 405, and supplies the MSE 400 with a signal indicating that the data is stored in the MLSL 405.

On the other hand, at the timing T19, the MSE 400 loads MEMP to the MAB 404, and supplies the sequencer 104 with the BRQ 406. At the timings T20 and T21, the ALU 402 calculates MEMP+1. At the timing T22, the MSE 400 detects that "SFR" is loaded to the MLSL 405, and loads "SFR" to the TEMP 403. At the timings T23 to T26, MEMP+1 is rewritten to the macroservice channel.

On the other hand, at the timing T23 to T26, the EXU 100 continues executing the reading operation from the memory as the next signal BRQ 406 is supplied from the MSE 400 at the timing T19. At the timing T27, the EXU 100 reads "MEM" stored in the LSL 201 and loads it to the MLSL 405.

At the timing T27, the MSE 400 reads the content of the memory stored in the MLSL 405 and loads it to the TEMP 403.

At the timing T28 and thereafter, there is no signal BRQ 406 for requesting the bus cycle from the MSE 400, so that the EXU 100 continues executing commands of the current program.

At the timings T28 and T29, the MSE 400 calculates a sum of "SFR" and "MEM" to be retained therein. At the timing T30, the MSE 400 loads MEMP to the MAB 404 and supplies the BRQ 406. At the timing T31, the MSE 400 stores the sum of the content of the SFR designated by SFRP and the content of the memory in the MLSL 405. At the timings T32 and T33, the MSE 400 generates an address @MCS designating MSC in the macroservice channel. The MSE 400 reads MSC at the timings T34 to T37, calculates MSC−1 at the timings T38 and T39, and rewrites MSC−1 to the macroservice channel at the timings T40 to T43.

The EXU 100 executes commands of the current program from the timing T28 to T34. At the timings T35 to T38, the EXU 100 reads MEMP stored in the MAB 404, loads it in the AB 201, reads the sum of "SFR" and "MEM", loads it to the LSL 202, and transfers it to the memory. Thus, all the interrupting process finishes.

As explained above, the MSE 400 executes the macroservice process independently with the EXU 100 which may execute commands of the current program. Further, the EXU 100 carries out reading and writing operations of the SFR and the memory. Therefore, it takes only 43 clocks to carry out the interrupting process.

The EXU 100 starts executing the macroservice process at the timing T18 and finishes the process at the timing T38, however, the EXU 100 executes commands of the current program during T28 to T34, so that it takes practically only 14 clocks to execute the macroservice process.

In the conventional data processing apparatus, it takes at least 50 clocks to finish the macroservice process after the request signal for interruption is generated. Further, the EXU 100 will not accept the request signal until the command is finished if the EXU 100 is busy for executing commands of the current program when the request signal is generated. For example, if it takes another 5 clocks to finish executing the command, the EXU 100 accepts the request signal 5 clocks after the request signal is generated and then starts executing the macroservice process, so that the macroservice process finishes 55 clocks after the request signal is generated. On the other hand, in the preferred embodiment, it takes only 43 clocks to finish the macroservice process after the request signal is generated. Further, the MSE 400 accepts the request signal when it is generated and starts executing the macroservice process, so that the macroservice process finishes 43 clocks after the request signal is generated in any case. In fact, the EXU 100 starts a part of the macroservice process 5 clocks after the BRQ 406 is generated, and it takes 38 clocks to store the data of the interrupting process in the memory after the request signal is generated.

In addition, in the conventional data processing apparatus, the EXU 100 is occupied practically for 50 clocks by the macroservice process.

In the first preferred embodiment as explained above, however, the EXU 100 is occupied practically for only 14 clocks by the macroservice process, that is during the two periods from the timing T18 to T27 and from T35 to T38. Therefore, the EXU 100 can execute commands of the current program in other periods.

Next, a data processing apparatus in a second preferred embodiment according to the invention will be explained.

Figure 5:
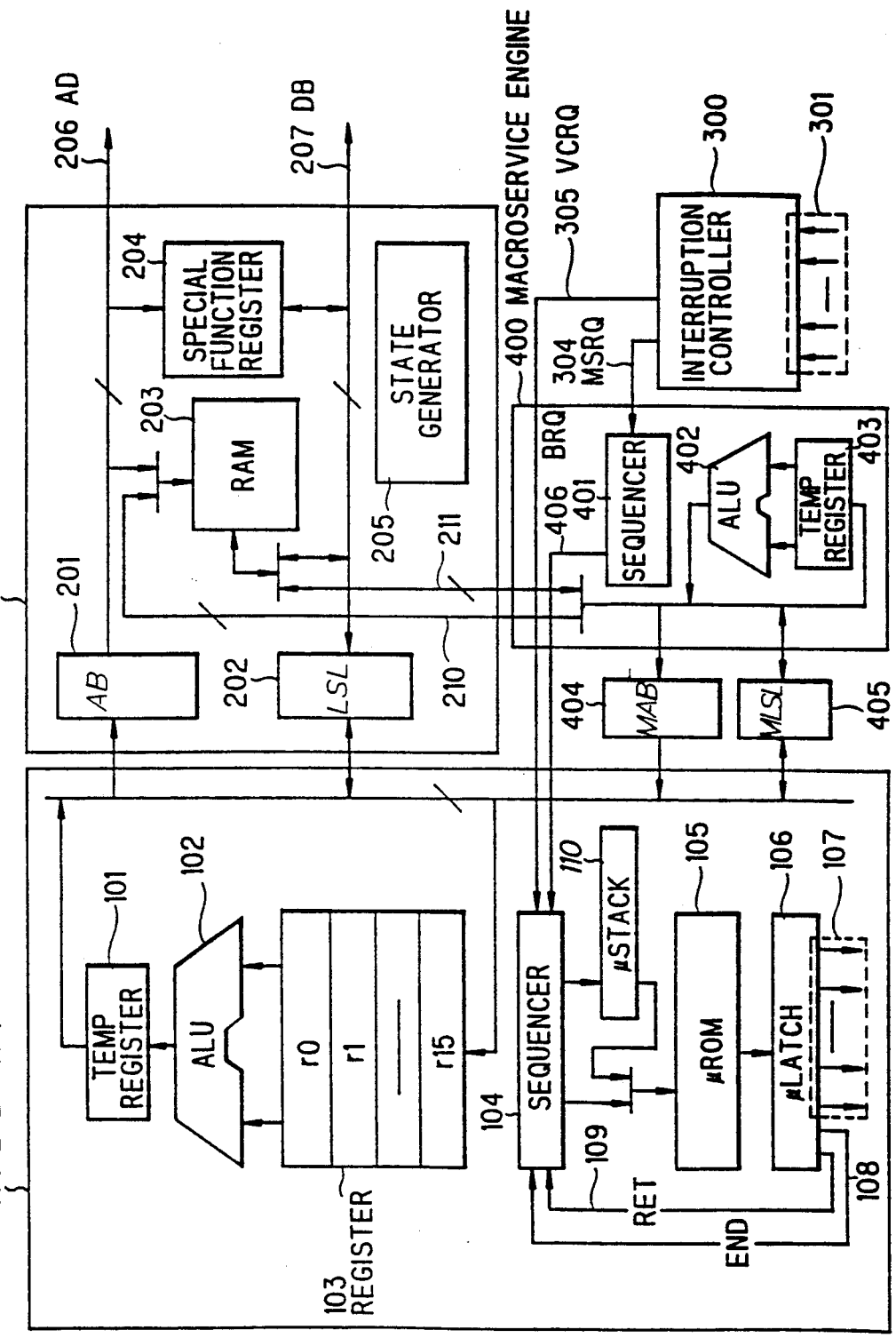
FIG. 5 is a block diagram of a data processing apparatus in a second preferred embodiment according to the invention.

FIG. 5 shows the data processing apparatus, wherein the basic structure of the data processing apparatus is the same as that of the data processing apparatus in the first preferred embodiment shown in FIG. 3, except that the EXU 100 of the data processing apparatus further includes a microstack (μ STACK) 110 for temporarily storing an address information of the microprogram to be executed at the timing when the BRQ 406 is supplied from the MSE 400.

The microprogram restarts from the address designated by the address information stored in the μ STACK 110 when a micro order signal RET 109 is supplied from the μ LATHC 106 to the sequencer 104.

FIG. 6 shows a sequence of the microservice interrupting process in the data processing apparatus after the sequencer 401 accepts the request signal MSRQ 304 supplied from the INTC 300. The sequence is the same as that shown in FIG. 4; however, some sequences are different in the EXU 100.

In details of the sequence, the EXU 100 accepts the BRQ 406 when it is supplied from the MSE 400, transfers an address information of the microprogram now in operation to the μ STACK 110, and starts executing the interrupting process corresponding to the BRQ 406. Thus, the EXU 100 is able to accept the BRQ 406 in any time even if the execution of commands of the current program is not finished.

At the timing T13, the EXU 100 reads SFRP stored in the MAB 404, loads it to the AB 201, and starts reading process of the SFR 204. The EXU 100 reads the SFR 204 at the timings T13 to T16, and loads "SFR" stored in the LSL 202 to the MLSL 405. At this timing, the EXU 100 finishes a series of the processes requested by the MSE 400, so that the sequencer 104 is supplied with the RET 109 in the EXU 100, the address of the microprogram stored in the μ STACK 110 is read, and the EXU 100 restarts executing the suspended process.

At the timings T20 to T23, the EXU 100 executes reading process of the memory in response to the BRQ 406 newly supplied from the MSE 400 at the timing T19. At the timing T24, the EXU 100 reads "MEM" stored in the LSL 201 and loads it to the MLSL 405. At the timings T25 to T27, the EXU 100 continues executing commands of the current program, because there is no request signal BRQ 406 from the MSE 400 requesting the bus cycle. At the timings T28 to T31, the EXU 100 reads MEMP stored in the MAB 404, loads it to the AB 201, reads the sum of "SFR" and "MEM" stored in the MLSL 405, loads it to the LSL 202, and carries out the writing process of the memory. Thus, all the interrupting process finishes.

As explained above, the EXU 100 starts executing the process relating to the macroservice at the timing T13 and finishes the process at the timing T31, however, the EXU 100 executes commands of the current program at the timings T18, T19, and T25 to T27. Therefore, the EXU 100 is occupied practically for 14 clocks by the process relating to the macroservice, as the same as in the first preferred embodiment. The EXU 100 finishes the process relating to the macroservice 19 clocks after the request signal BRQ 406 is generated. There exists one clock in which no process is carried out in the sequence of the MSE 400, so that the total clocks becomes 44 clocks, which is one clock longer than that in the first preferred embodiment. However, the EXU 100 finishes the process relating to the macroservice by transferring the data to the memory at the timing T31, so that it takes actually 31 clocks to finish the interrupting process from the timing when the request signal is generated.

Next, a data processing apparatus in a third preferred embodiment according to the invention will be explained.

Figure 7:
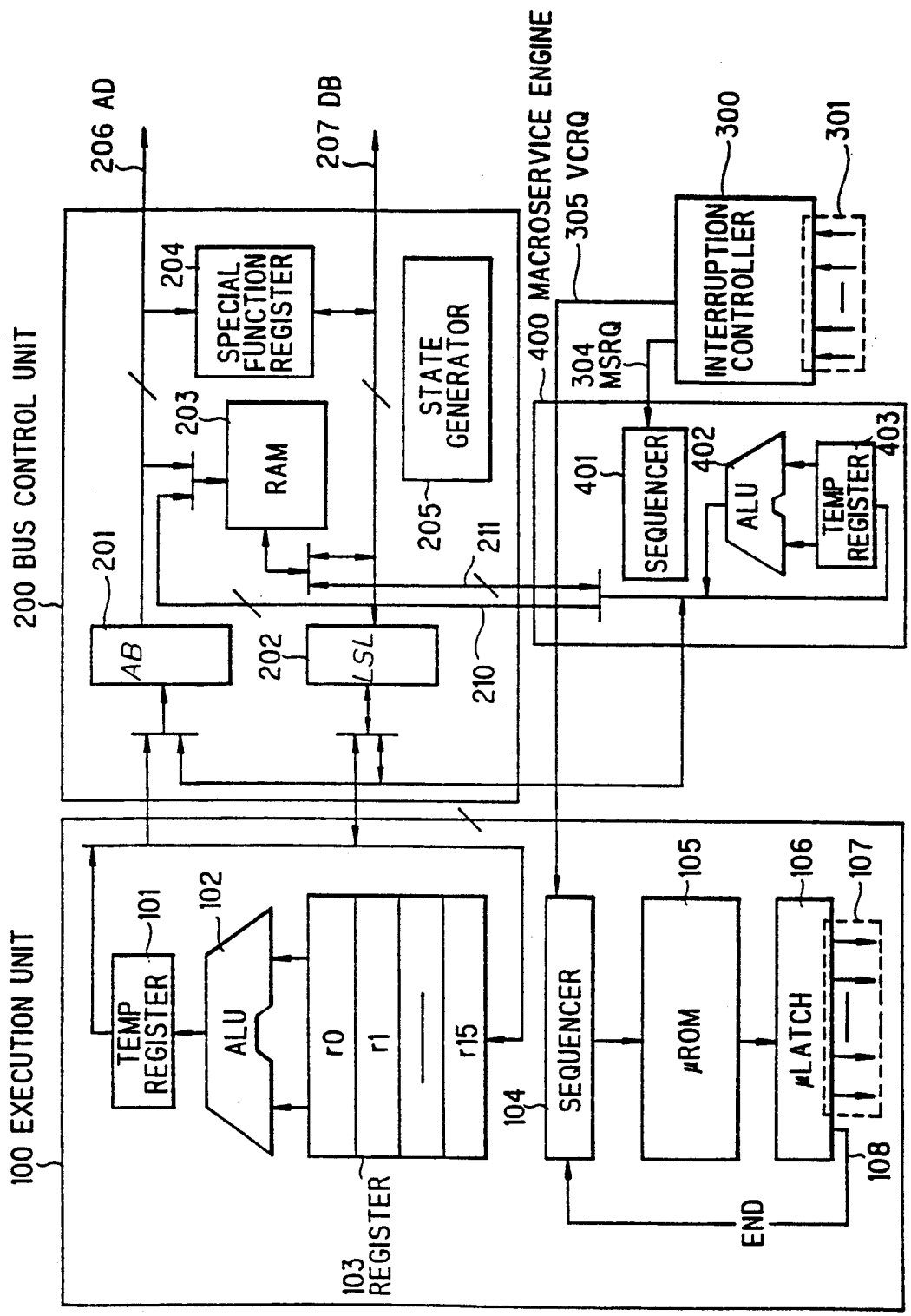
FIG. 7 is a block diagram of a data processing apparatus in a third preferred embodiment according to the invention.

FIG. 7 shows the data processing apparatus, wherein the basic structure of the data processing apparatus is the same as that of the data processing apparatus in the first preferred embodiment shown in FIG. 3, except that the EXU 100 and the MSE 400 are provided independently to each other. In more detail, the data processing apparatus does not include an MAB 404 and an MLSL 405, and a signal BRQ 406 is not supplied from the sequencer 401 of the MSE 400. The MSE 400 is directly interfaced with the BCU 200 in accessing an address of the memory or the SFR by connecting inner buses of the MSE 400 with the AB 201 and the LSL 202 of the BCU 200.

FIG. 8 shows a sequence of the microservice interrupting process in the data processing apparatus after the sequencer 401 accepts the request signal MSRQ 304 supplied from the INTC 300. As explained above, the EXU 100 does not execute any process relating to the macroservice, so that the sequence of the EXU 100 is not shown in FIG. 8. Instead of the EXU 100, the sequence of the BCU 200 is shown in FIG. 8.

In details of the sequence, if the sequencer 401 of the MSE 400 accepts the SMRQ 304, it starts accessing the macroservice channel stored in the RAM 203 corresponding to the interrupting source. At the timings T1 to T4, the MSE 400 executes reading of MODE. At the timings T6 and T7, the MSE 400 generates an address @SFRP of SFRP in the macroservice channel using the ALU 402. At the timings T8 to T11, the MSE 400 executes reading process of SFRP.

At the timing T12, the MSE 400 loads SFRP directly to the AB 201, and commands the BCU 200 to read the SFR 204. In some cases, there is a possibility that the EXU 100 and the MSE 400 may compete in writing an address to the AB 201, because the AB 201 is used not only by the MSE 400 but also by the EXU 100 in setting a program address or a data address therefrom. Therefore, in such a case, it is required to arbitrate operations of the EXU 100 and the MSE 400 or to make a waiting time in writing data to the AB 201 for the EXU 100 or the MSE 400. However, in this explanation, it is supposed that there is no competition between the EXU 100 and the MSE 400 and the MSE 400 is able to write an address to the AB 201 in any time without a waiting time.

At the timings T12 to T15, the BCU 200 executes reading the SFR 204 in response to the command from the MSE 400.

At the timings T13 and T14, the MSE 400 generates an address @MEMP of MEMP in the macroservice channel using the ALU 402. The MSE 400 executes reading process of MEMP at the timings T15 to T18. The MSE 400 loads MEMP to the AB 201, and generates a request signal for the BCU 200 to read the memory. The MSE 400 reads "SFR" which is already stored in the LSL 202, and loads it to the TEMP 403. The MSE 400 calculates MEMP+1 by the ALU 402.

The BCU 200 executes reading process of the memory at the timings T19 to T22 in response to the request from the MSE 400.

At the timing T23, the MSE 400 reads the data of the memory stored in the LSL 202, and loads temporarily to the TEMP 403. At the timings T24 and T25, the MSE 400 calculates a sum of "SFR" and "MEM" to be retained therein. The MSE 400 loads MEMP to the AB 201 at the timing T26, and loads the sum to the LSL 201 and supplies the BCU 200 with a request signal to write the memory at the timing T27.

The BCU 200 executes reading process of the memory at the timing T26 to T29 in response to the request signal from the MSE 400.

The MSE 400 rewrites MEMP+1 to the macroservice channel at the timings T28 to T31, and generates an address @MSC of MSC in the macroservice channel at the timings T32 and T33. Finally, the MSE 400 reads MSC at the timings T34 to T37, calculates MSC−1 at the timings T38 and T39, and rewrites MSC−1 to the macroservice channel. Thus, all the macroservice process finishes.

As explained above, the BCU 200 is occupied with executing processes relating to the macroservice for 12 clocks at the timings T12 to T15, T19 to T22, and T26 to T29. On the other hand, the MSE 400 is occupied with executing the macroservice process for 43 clocks, which is the same as that in the first preferred embodiment. The EXU 100 does not execute any process relating to the macroservice, so that the EXU 100 can continue processing the current program while the macroservice process is executed by the MSE 400 and the BCU 200.

The μ ROM 105 of the EXU 100 stores a microprogram including an access routine for accessing the memory and the SFR, so that it is possible to use the access routine in the macroservice process. In the first and second preferred embodiments, the EXU 100 carries out accessing the memory and the SFR 204 using the access routine, and the MSE 400 carries out operation of the macroservice channel process and the macroservice process. Thus, a burden of the MSE 400 is reduced. In the third preferred embodiment, however, all of the macroservice process including accessing the memory and the SFR are carried out by the MSE 400 and the BCU 200, and the EXU 100 does not execute any process relating to the macroservice. Thus, the independency of the EXU 100 and the MSE 400 is improved, so that the macroservice process can be carried out in a high speed as well as the total ability for processing data is improved.

In fact, the interrupting process finishes by loading data to the memory, so that the critical time is a period from a timing when the request for interruption is generated to a timing when the data is stored in the memory. In the first to third preferred embodiments, the data is loaded to the memory by 38 clocks, 31 clocks and 29 clocks, respectively, after the request signal for interruption is generated. Therefore, the data processing apparatus in the third preferred embodiment is the most preferable.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. A data processing apparatus, comprising:
   a central processing unit for carrying out a predetermined logic calculation to control peripheral circuits;
   an interruption controller for generating a processing request signal in response to an interruption request signal;
   a data control unit connected to receive said processing request signal and carrying out a sequence control of a predetermined processing in response to said processing request signal, said data control unit generating an access request signal to said central processing unit;
   a memory for storing predetermined processing information including an address of a specified register of a peripheral register set relating to said peripheral circuits, an address of a specified memory region of said memory, and a specified processing information; and
   means for accessing a predetermined space of said memory directly from said data control unit;
   wherein said data control unit accesses said peripheral register set and said memory in accordance with said addresses of said specified register and memory region when said access request signal is generated, and carries out said predetermined processing in accordance with said specified processing information.

2. A data processing apparatus, according to claim 1, wherein:
   said data control unit interfaces through an address register and a data register with said central processing unit, said address register being loaded with an address of said memory or said peripheral register, and said data register being loaded with data read from said memory or said peripheral register.

3. A data processing apparatus, according to claim 1, wherein:
   said central processing unit holds a state which is executed at a time when said access request signal is generated in said data control unit, and starts an execution of a processing instructed by said access request signal, said central processing unit restoring said state which is held to be executed when said execution of said instructed processing is finished.

4. A data processing apparatus, according to claim 2, wherein:
   said central processing unit includes a bus control unit and a command execution unit, said data control unit interfacing through said address register and said data register with said bus control unit, and said command execution unit operating in parallel with said data control unit without any interference from each other.

* * * * *